US012648514B2

(12) United States Patent
Blom et al.

(10) Patent No.: US 12,648,514 B2
(45) Date of Patent: Jun. 9, 2026

(54) NAVIGATION FOR A ROBOTIC LAWNMOWER SYSTEM

(71) Applicant: HUSQVARNA AB, Huskvarna (SE)

(72) Inventors: Robert Blom, Jonkoping (SE); Jonas Rangsjo, Vikingstad (SE)

(73) Assignee: HUSQVARNA AB, Huskvarna (SE)

( * ) Notice: Subject to any disclaimer, the term of this patent is extended or adjusted under 35 U.S.C. 154(b) by 40 days.

(21) Appl. No.: 18/733,066

(22) Filed: Jun. 4, 2024

(65) Prior Publication Data

US 2024/0407290 A1    Dec. 12, 2024

(30) Foreign Application Priority Data

Jun. 8, 2023    (SE) ..................................... 2350697-5

(51) Int. Cl.
A01D 34/00        (2006.01)
A01D 101/00       (2006.01)

(52) U.S. Cl.
CPC ........ A01D 34/008 (2013.01); *A01D 2101/00* (2013.01)

(58) Field of Classification Search
CPC .......................... A01D 34/008; A01D 2101/00
See application file for complete search history.

(56) References Cited

U.S. PATENT DOCUMENTS

2007/0085737 A1    4/2007  Eslinger et al.
2009/0030549 A1*   1/2009  Sakai ..................... F16P 3/147
                                                                700/245

| 2018/0364735 | A1* | 12/2018 | Holmström ............. G01S 19/29 |
|---|---|---|---|
| 2019/0204844 | A1* | 7/2019 | Lau ...................... G05D 1/0274 |
| 2021/0165109 | A1 | 6/2021 | Yang et al. |
| 2022/0124973 | A1 | 4/2022 | Juel |
| 2023/0115421 | A1 | 4/2023 | He et al. |
| 2024/0385623 | A1* | 11/2024 | Ishihira .................. G05D 1/243 |
| 2025/0160248 | A1* | 5/2025 | Zhuang .................. G01S 19/48 |

FOREIGN PATENT DOCUMENTS

| EP | 3069204 A1 | 9/2016 |
|---|---|---|
| EP | 3384318 A1 | 10/2018 |
| EP | 3761064 A1 | 1/2021 |
| SE | 538373 C2 | 5/2016 |

(Continued)

OTHER PUBLICATIONS

Search Report and Office Action for Swedish Application No. 2350697-5 mailed Jan. 19, 2024.

*Primary Examiner* — Hunter B Lonsberry
*Assistant Examiner* — Harrison Heflin
(74) *Attorney, Agent, or Firm* — Burr & Forman

(57)        ABSTRACT

A method for use in a robotic lawnmower system comprising a robotic lawnmower arranged to operate in an operational area based on the satellite navigation sensor, determining that the robotic lawnmower is in a satellite shadowed area and in response thereto querying the map application for a reference object, and navigate to the reference object based on the deduced reckoning sensor, determining that the reference object has been reached based on the object sensor and, if so, confirming a new position of the robotic lawnmower, determining that the robotic lawnmower is not in the satellite shadowed area and in response thereto again operate based on the satellite navigation sensor.

14 Claims, 5 Drawing Sheets

(56)     References Cited

FOREIGN PATENT DOCUMENTS

| | | | |
|---|---|---|---|
| SE | 540131 | C2 | 4/2018 |
| SE | 2151275 | A1 | 4/2023 |
| WO | 2015/094054 | A1 | 6/2015 |
| WO | 2017/177929 | A1 | 10/2017 |
| WO | 2020/143972 | A1 | 7/2020 |
| WO | 2023/068976 | A1 | 4/2023 |

* cited by examiner

NAVIGATION FOR A ROBOTIC LAWNMOWER SYSTEM

TECHNICAL FIELD

This application relates to a robotic lawnmower and in particular to a system and a method for providing an improved navigation for robotic lawnmowers in such a system.

BACKGROUND

Automated or robotic lawnmowers are becoming increasingly more popular and so is the use of the robotic lawnmower in various types of operational areas. Furthermore, there is also a trend for satellite navigation and virtual borders for such robotic lawnmowers and specifically for performing (sophisticated) patterns in the grass or other work that requires high accuracy. However, sometimes the robotic lawnmowers are not able to properly navigate the pattern, especially in areas where there are many structures or foliage.

Thus, there is a need for an improved manner of navigating with high accuracy, especially in areas where there are many structures or foliage.

SUMMARY

The inventors are proposing to achieve this by maneuvering the robotic lawnmower to reference objects having known positions and there (re) confirm the robotic lawnmower's position and allow to it continue operating based on the confirmed position.

a. It is therefore an object of the teachings of this application to overcome or at least reduce those problems by providing a robotic lawnmower system comprising a robotic lawnmower arranged to operate in an operational area, the robotic lawnmower comprising a satellite navigation sensor, a deduced reckoning sensor, an object sensor, a memory storing a memory application, and a controller configured for causing the robotic lawnmower to operate in the operational area based on the satellite navigation sensor, determining that the robotic lawnmower is in a satellite shadowed area and in response thereto querying the map application for a reference object, causing the robotic lawnmower to navigate to the reference object based on the deduced reckoning sensor, determining that the reference object has been reached based on the object sensor and, if so, confirming a new position of the robotic lawnmower, determining that the robotic lawnmower is not in the satellite shadowed area and in response thereto causing the robotic lawnmower to again operate in the operational area based on the satellite navigation sensor.

This has the benefit that the robotic lawnmower is enabled to navigate also in satellite shadowed areas with a high accuracy, as the position is again and again confirmed.

Further embodiments are as in the following detailed description and as per the appended patent claims.

It is also an object of the teachings of this application to overcome the problems by providing a method for use in robotic lawnmower system comprising a robotic lawnmower arranged to operate in an operational area, the robotic lawnmower comprising a satellite navigation sensor, a deduced reckoning sensor, an object sensor, and a memory storing a memory application, wherein the method comprises causing the robotic lawnmower to operate in the operational area based on the satellite navigation sensor, determining that the robotic lawnmower is in a satellite shadowed area and in response thereto querying the map application for a reference object, causing the robotic lawnmower to navigate to the reference object based on the deduced reckoning sensor, determining that the reference object has been reached based on the object sensor and, if so, confirming a new position of the robotic lawnmower, determining that the robotic lawnmower is not in the satellite shadowed area and in response thereto causing the robotic lawnmower to again operate in the operational area based on the satellite navigation sensor.

Further embodiments and aspects are as in the attached patent claims and as discussed in the detailed description.

Other features and advantages of the disclosed embodiments will appear from the following detailed disclosure, from the attached dependent claims as well as from the drawings. Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention will be described in further detail under reference to the accompanying drawings in which.

DETAILED DESCRIPTION

The disclosed embodiments will now be described more fully hereinafter with reference to the accompanying drawings, in which certain embodiments of the invention are shown. This invention may, however, be embodied in many different forms and should not be construed as limited to the embodiments set forth herein. Like reference numbers refer to like elements throughout.

Figure 1:
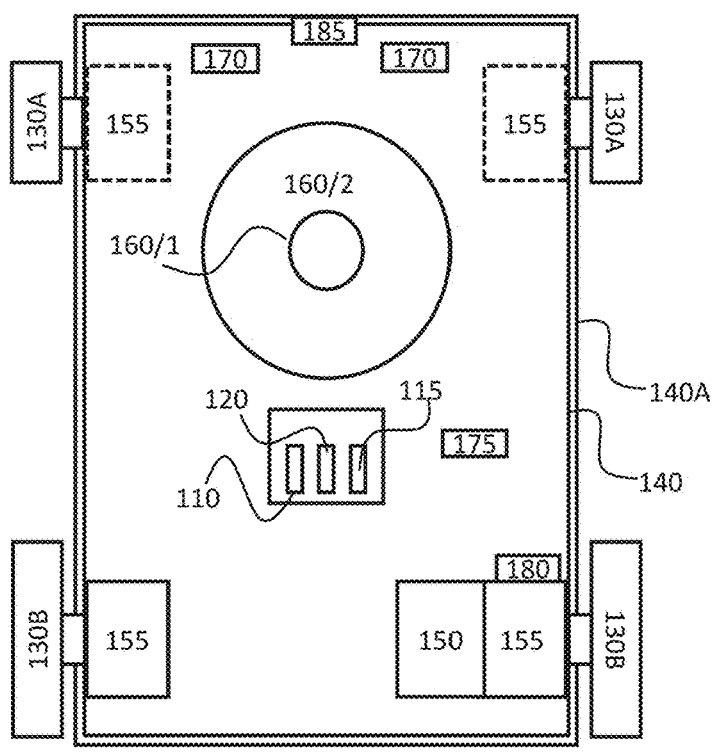
FIG. 1 shows a schematic view of the components of an example of a robotic lawnmower according to some example embodiments of the teachings herein.

FIG. 1 shows a schematic overview of a robotic lawnmower 100. The robotic lawnmower 100 may be a multi-chassis type or a mono-chassis type (as in FIG. 1). A multi-chassis type comprises more than one main body parts that are movable with respect to one another. A mono-chassis type comprises only one main body part.

It should be noted that robotic lawnmower may be of different sizes, where the size ranges from merely a few decimetres for small garden robots, to even more than 1 meter for large robots arranged to service for example airfields.

It should also be noted that the robotic lawnmower is a self-propelled robotic lawnmower, capable of autonomous navigation within a work area, where the robotic lawn-mower propels itself across or around the work area in a pattern (random or predetermined).

The robotic lawnmower 100 has a main body part 140, possibly comprising a chassis 140 and an outer shell 140A, and a plurality of wheels 130 (in this example four wheels 130, but other number of wheels are also possible, such as three or six).

The main body part 140 substantially houses all compo-nents of the robotic lawnmower 100. At least some of the wheels 130 are drivably connected to at least one electric motor 155 powered by a battery 150. It should be noted that even if the description herein is focused on electric motors, combustion engines may alternatively be used, possibly in combination with an electric motor. In the example of FIG. 1, each of the wheels 130 is connected to a common or to a respective electric motor 155 for driving the wheels 130 to navigate the robotic lawnmower 100 in different manners. The wheels, the motor 155 and possibly the battery 150 are thus examples of components making up a propulsion device. By controlling the motors 155, the propulsion device may be controlled to propel the robotic lawnmower 100 in a desired manner, and the propulsion device will therefore be seen as synonymous with the motor(s) 150.

It should be noted that wheels 130 driven by electric motors is only one example of a propulsion system and other variants are possible such as caterpillar tracks.

The robotic lawnmower 100 also comprises a controller 110 and a computer readable storage medium or memory 120. The controller 110 may be implemented using instruc-tions that enable hardware functionality, for example, by using executable computer program instructions in a gen-eral-purpose or special-purpose processor that may be stored on the memory 120 to be executed by such a processor. The controller 110 is configured to read instructions from the memory 120 and execute these instructions to control the operation of the robotic lawnmower 100 including, but not being limited to, the propulsion and navigation of the robotic lawnmower.

The controller 110 in combination with the electric motor 155 and the wheels 130 forms the base of a navigation system (possibly comprising further components) for the robotic lawnmower, enabling it to be self-propelled as discussed.

The controller 110 may be implemented using any suit-able, available processor or Programmable Logic Circuit (PLC). The memory 120 may be implemented using any commonly known technology for computer-readable memo-ries such as ROM, FLASH, DDR, or some other memory technology.

The robotic lawnmower 100 is further arranged with a wireless communication interface 115 for communicating with other devices, such as a server, a personal computer, a smartphone, the charging station, and/or other robotic lawn-mowers. Examples of such wireless communication devices are Bluetooth®, WiFi® (IEEE802.11b), Global System Mobile (GSM) and LTE (Long Term Evolution), to name a few.

The robotic lawnmower 100 also comprises a grass cut-ting device 160, such as a rotating blade 160/2 driven by a cutter motor 160/1.

The robotic lawnmower 100 further comprises at least one satellite signal navigation sensor 175 configured to provide navigational information (such as position) based on receiv-ing one or more signals from a satellite-possibly in combi-nation with receiving a signal from a beacon. In some embodiments the satellite navigation sensor is a GPS (Global Positioning System) device or other Global Navi-gation Satellite System (GNSS) device. In some embodi-ments the satellite navigation sensor is a RTK sensor.

The robotic lawnmower 100 may also or alternatively comprise deduced reckoning sensors 180. The deduced reckoning sensors may be odometers, accelerometer or other deduced reckoning sensors. In some embodiments, the deduced reckoning sensors are comprised in the propulsion device, wherein a deduced reckoning navigation may be provided by knowing the current supplied to a motor and the time the current is supplied, which will give an indication of the speed and thereby distance for the corresponding wheel.

The robotic lawnmower 100 is in some embodiments arranged to operate according to a map application repre-senting one or more work areas (and possibly the surround-ings of the work area(s)) stored in the memory 120 of the robotic lawnmower 100. The map application may be gen-erated or supplemented as the robotic lawnmower 100 operates or otherwise moves around in the work area 205. In some embodiments, the map application includes one or more start regions and one or more goal regions for each work area. In some embodiments, the map application also includes one or more transport areas. The robotic lawn-mower 100 is in some embodiments arranged to navigate according to the map based on the satellite navigation sensor 175 and/or the deduced reckoning sensors 180.

For F enabling the robotic lawnmower 100 to navigate with reference to a boundary wire (referenced 220 in FIG. 2) emitting a magnetic field caused by a control signal trans-mitted through the wire, the robotic lawnmower 100 is in some embodiments configured to have at least one magnetic field sensor 170 arranged to detect the magnetic field and for detecting the wire and/or for receiving (and possibly also sending) information to/from a signal generator.

The robotic lawnmower 100 also comprises one or more than one object sensors 185. In some embodiments the object sensor 185 is a collision sensor which is configured to detect a collision (possibly through a change in geometry of the housing of the robotic lawnmower 100 or by detecting a deceleration pattern specific to collisions through the use of a gyro or other inertial measurement unit (IMU))) with an object. Collision sensors are generally known and no further details will be given. In some alternative or additional embodiments the object sensor 185 is a visual sensor, such as an image sensor which is configured to detect an object by capturing one or more images and performing image analysis on these images. Such image sensors are generally known and no further details will be given. In some alter-native or additional embodiments the object sensor 185 is a distance sensor, such as laser or radar, which is configured to detect an object by detecting that the distance to some-thing in front of the robotic lawnmower is below a threshold distance. Such distance sensors are generally known and no further details will be given.

Figure 2:
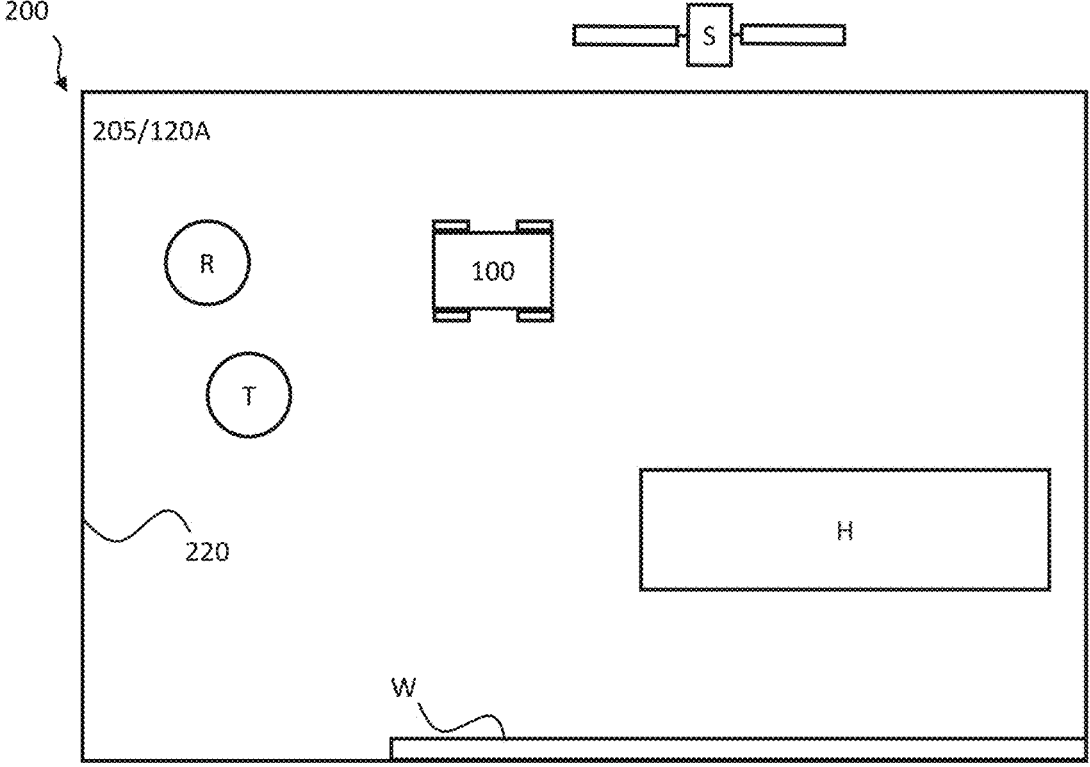
FIG. 2 shows a schematic view of a robotic lawnmower system according to some example embodiments of the teachings herein.

FIG. 2 shows a robotic lawnmower system 200 in some embodiments. The schematic view is not to scale. The robotic lawnmower system 200 comprises one or more robotic lawnmowers 100 according to the teachings herein. It should be noted that the operational area 205 shown in FIG. 2 is simplified for illustrative purposes. The schematic view of FIG. 2 also illustrates a graphic representation of a map application 120A stored in the memory of the robotic lawnmower 100 as discussed in the above.

The robotic lawnmower 100 is also or alternatively arranged to operate according to a virtual boundary referenced 220 specified in the map application 120A based on the satellite navigation sensor(s) 175, and/or the deduced reckoning sensors 180.

The example of FIG. 2 also shows a satellite to represent the various satellites referenced S necessary for establishing or determining a position using satellite navigation. Also, the satellite of FIG. 2 is taken to also represent various types of beacons that may be utilized in order to increase the accuracy and/or coverage of a satellite navigation system, such as in Real Time Kinetic (RTK) systems.

The robotic lawnmower system comprises, in some embodiments, a boundary wire also referenced 220 through which a control signal is transmitted thereby generating a magnetic field, and which magnetic field is sensed by sensor(s) (170) in the robotic lawnmower 100. In some embodiments the control signal is generated by a signal generator comprised in a station. The boundary may thus in some embodiments act as a supplement to the virtual boundary.

As with FIG. 1, the robotic lawnmower(s) is exemplified by a robotic lawnmower, whereby the robotic lawnmower system may be a robotic lawnmower system or a system comprising a combination of robotic lawnmowers, one being a robotic lawnmower, but the teachings herein may also be applied to other robotic lawnmowers adapted to operate within a work area.

In some embodiments the robotic lawnmower is arranged or configured to traverse and operate in work areas that are not essentially flat, but contain terrain that is of varying altitude, such as undulating, comprising hills or slopes or such. The ground of such terrain is not flat and it is not straightforward how to determine an angle between a sensor mounted on the robotic lawnmower and the ground. The robotic lawnmower is also or alternatively arranged or configured to traverse and operate in a work area that contains obstacles that are not easily discerned from the ground. Examples of such are grass or moss-covered rocks, roots or other obstacles that are close to ground and of a similar colour or texture as the ground. The robotic lawnmower is also or alternatively arranged or configured to traverse and operate in a work area that contains obstacles that are overhanging, i.e. obstacles that may not be detectable from the ground up, such as low hanging branches of trees or bushes. Such a garden is thus not simply a flat lawn to be mowed or similar, but a work area of unpredictable structure and characteristics. The work area 205 exemplified with referenced to FIG. 2, may thus be such a non-uniform work area as disclosed in this paragraph that the robotic lawnmower is arranged to traverse and/or operate in.

As is shown in FIG. 2 there may be obstacles such as houses (referenced H), structures, trees (referenced T), rocks (referenced R) to mention a few examples that block signal reception in certain areas, hereafter referred to as shadowed areas. In FIG. 2 such obstacles are indicated and referenced H (as in house). Additionally the boundary may comprise one or more than one such obstacles, for example a wall referenced W or fence.

Returning to the map application, the map application is in some embodiments configured to store the location of one, some or all of these obstacles. The map application 120 thus contain one or more than one stored or known obstacles and the robotic lawnmower 100 thus has knowledge of the position of one or more than one of the obstacles in the operational area, be it trees, stones, structures or walls. In some embodiments the boundary wire is also a known obstacle.

Figure 3:
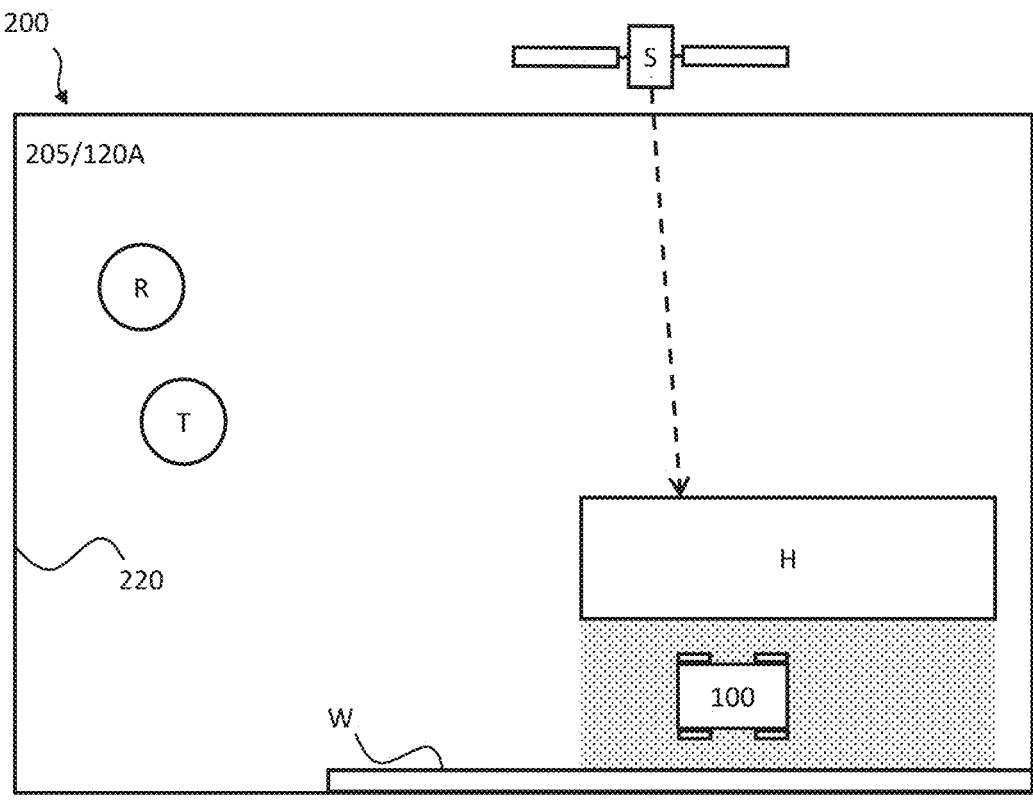
FIG. 3 shows a schematic view of an intended pattern being serviced in a traditional manner.

FIG. 3 is a schematic view of a robotic lawnmower system 200 as in FIG. 2, the robotic lawnmower system 200 comprising one or more robotic lawnmower(s) 100 as discussed in relation to FIGS. 1 and 2.

As is illustrated in FIG. 3, there may be areas where the satellite reception is insufficient to determine a position of the robotic lawnmower 100 accurately. As a skilled person would understand determining a position utilizing satellite navigation (including possibly beacon-based systems) requires the reception of several reference signals transmitted from the satellites and/or beacons. For example, to establish a position in three dimensions requires 4 signals. However, in order to accurately determine such a position requires many more signals, and most contemporary satellite navigation systems utilize many more satellites, for example 12 or 16 signals. As a skilled person would also understand there may be areas where one or more of the satellites (and/or beacons) are blocked by for example structures or foliage. In such areas, the received signals are not of a sufficiently high quality—as regards the number of signals received and/or the signal level that the signals are received at. Such an area will hereafter be defined as an area where the received satellite signals (including any beacon signals) are received at a signal quality level falling under a threshold acceptance level and be referred to as a satellite shadowed area. The robotic lawnmower 100 is in some embodiments configured to determine that the robotic lawnmower 100 is in such an area by determining that the number of reference (satellite or beacon) signals received fall under an acceptance number and/or by determining that the quality of received reference (satellite or beacon) signals fall under an acceptance level.

Returning to FIG. 3, in such satellite shadowed areas, the robotic lawnmower 100 may be unable to determine its position adequately. In some prior art systems, the robotic lawnmower 100 is then configured to supplement the navigation based on for example deduced reckoning. However, deduced reckoning suffers from a number of drawbacks and can thus not be relied upon and the prior art systems therefore propose to leave the satellite shadowed area as soon as possible and then to reconfirm the position of the robotic lawnmower 100 and continue operation, possibly after calibrating the deduced reckoning sensors. However, the inventors have proposed an alternative to such systems which enables for a better servicing of the satellite shadowed areas that does not require the robotic lawnmower 100 to (hurriedly) leave the satellite shadowed area.

In FIG. 3 there is such a satellite shadowed area exemplified behind the house H and indicated by the dotted area and referenced SSA, where it is illustrated how a signal from the satellite S is blocked by the house. Any robotic lawnmower 100 operating in the satellite shadowed area will thus suffer from a reduced accuracy when operating according to a prior art system.

Figure 4A:
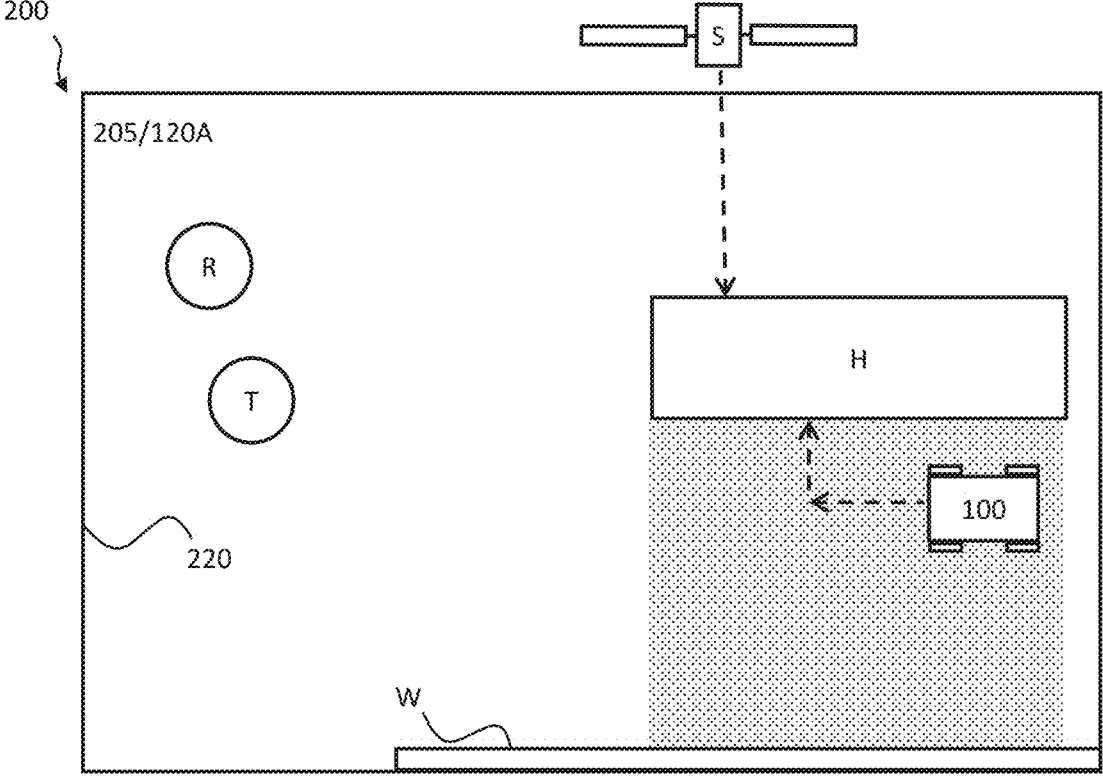
FIGS. 4A, 4B, 4C, 4D and 4E show a schematic view of an intended pattern being serviced according to some example embodiments of the teachings herein.

FIG. 4A is a schematic view of a robotic lawnmower system 200 as in FIG. 2, the robotic lawnmower system 200 comprising one or more robotic lawnmower(s) 100 as discussed in relation to FIGS. 1 and 2, wherein the robotic lawnmower 100 is configured to operate as per the teachings herein.

As the robotic lawnmower 100 determines that the accuracy for determining a location is reduced, such as by determining that robotic lawnmower is in a satellite shadowed area, the robotic lawnmower 100 notes its position. In some embodiments the position is the last accurately determined position. In some embodiments the position is the current position. In some embodiments the robotic lawnmower 100 also notes a budget distance. In some embodiments the budget distance is determined based on the length of the robotic lawnmower 100, for example 1 or 2 times the length of the robotic lawnmower. In some embodiments the budget distance is determined based on the accuracy of the satellite navigation, for example 1, 5 or 10 meters or any range there inbetween.

The robotic lawnmower 100 then queries the map application for a known obstacle. In some embodiments the robotic lawnmower 100 queries the map application 120A for a known obstacle within the budget distance. In some embodiments the robotic lawnmower 100 queries the map application 120A for a known obstacle within for example 1 or 2 times the length of the robotic lawnmower. In some embodiments the robotic lawnmower 100 queries the map application 120A for a known obstacle within for example 1, 5 or 10 meters or any range there inbetween. In some embodiments the robotic lawnmower 100 queries the map application 120A for the known obstacle being closest to the robotic lawnmower 100. In some embodiments the robotic lawnmower 100 queries the map application 120A for the known obstacle being closest to the robotic lawnmower 100 in the direction of travel (+/−90 degrees) for the robotic lawnmower 100. the known obstacle being closest to the robotic lawnmower 100 in the direction or path of an intended operating pattern.

The queried obstacle is then used or selected as a reference object for the robotic lawnmower 100, and the robotic lawnmower 100 continues to operate for a distance or time. In some embodiments the operating distance is equal to or less than the budget distance. In some embodiments the operating distance is equal to or less than for example 1 or 2 times the length of the robotic lawnmower. In some embodiments the operating distance is equal to or less than for example 1, 5 or 10 meters or any range there inbetween. No matter what the operating distance is, the operating distance includes the distance required to travel to the reference object. The robotic lawnmower 100 is thus enabled to continue operating (for a distance) even in the satellite shadowed area. Unless the satellite reception becomes reliable again (i.e. that the robotic lawnmower 100 determines that it is no longer operating in a satellite shadowed area), the robotic lawnmower 100 moves to the reference object.

In the example of FIG. 4A the obstacle closest to the robotic lawnmower 100 is the house H, and is assumed to be the reference object selected. The robotic lawnmower 100 of FIG. 4A is thus enabled to continue operating in its intended direction for a distance and is then controlled to navigate to the reference object as is indicated by the arrow in FIG. 4A.

During this continued navigation the robotic lawnmower 100 is in some embodiments configured to operate according to the deduced reckoning sensors 180.

As the robotic lawnmower 100 approaches or reaches the reference object the robotic lawnmower 100 determines that the reference object has been reached through the use of the object sensor 185. How the robotic lawnmower 100 determines that the reference object has been reached depends on the type of obstacle sensor used. As an example, if the obstacle sensor 185 is a collision sensor, the robotic lawnmower 100 determines that the reference object has been reached by detecting a collision. As another example, if the obstacle sensor 185 is an image sensor, the robotic lawnmower 100 determines that the reference object has been reached by identifying the reference object through image processing. As another example, if the obstacle sensor 185 is a distance sensor, the robotic lawnmower 100 determines that the reference object has been reached by detecting that the distance to any object in front of the robotic lawnmower 100 has fallen under a detection distance, for example 10, 20 or 50 cm.

In some embodiments the robotic lawnmower 100 is further configured to determine that the reference object was reached by determining that the reference object is at an expected position. In some such embodiments the robotic lawnmower 100 is configured to determine that the reference object is at the expected position by determining the current position of the robotic lawnmower 100 (based on the deduced reckoning sensors 180) and comparing to the stored position for the reference object as per the map application 120A. In some alternative or additional such embodiments, the robotic lawnmower 100 is configured to determine that the reference object is at the expected position by determining a travelled distance and comparing this to a determined expected distance to be travelled to reach the reference object, i.e. the distance from the previous position of the robotic lawnmower 100 to the reference object (along an intended path to the reference object).

Figure 4B:
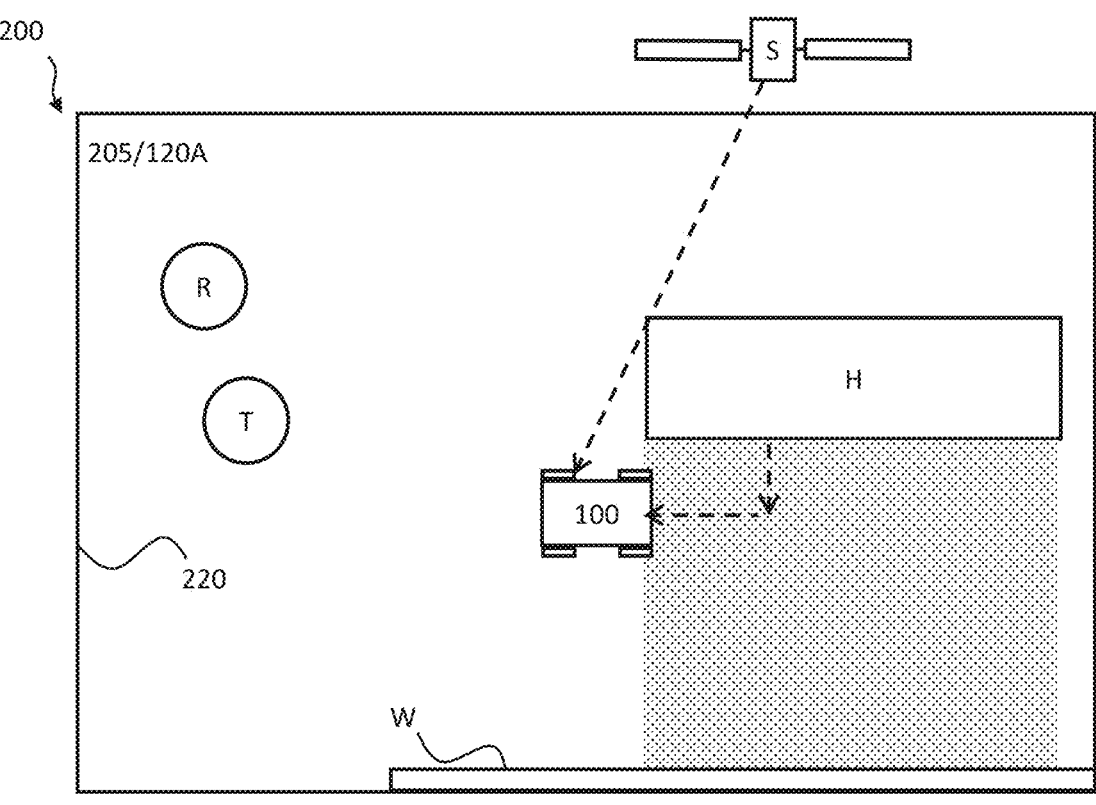

As the robotic lawnmower determines that the reference object has been reached, the robotic lawnmower 100 determines its (new) position and queries the map application for a further reference object based on its new position. The new position can be confirmed or determined more accurately as the robotic lawnmower 100 knows that the new position is adjacent the reference object. FIG. 4B shows an example where the robotic lawnmower 100 has reached the reference object (the house) and confirmed its position. As the position has been confirmed the operating distance (in some embodiments the budget distance) is renewed and the robotic lawnmower 100 continues operating seeking out the further reference object as for navigating to the (first) reference object discussed above.

In the example of FIG. 4B the robotic lawnmower 100 reaches the end of the satellite shadowed area and continues operation along the intended operating pattern (without the reference object).

Figure 4C:
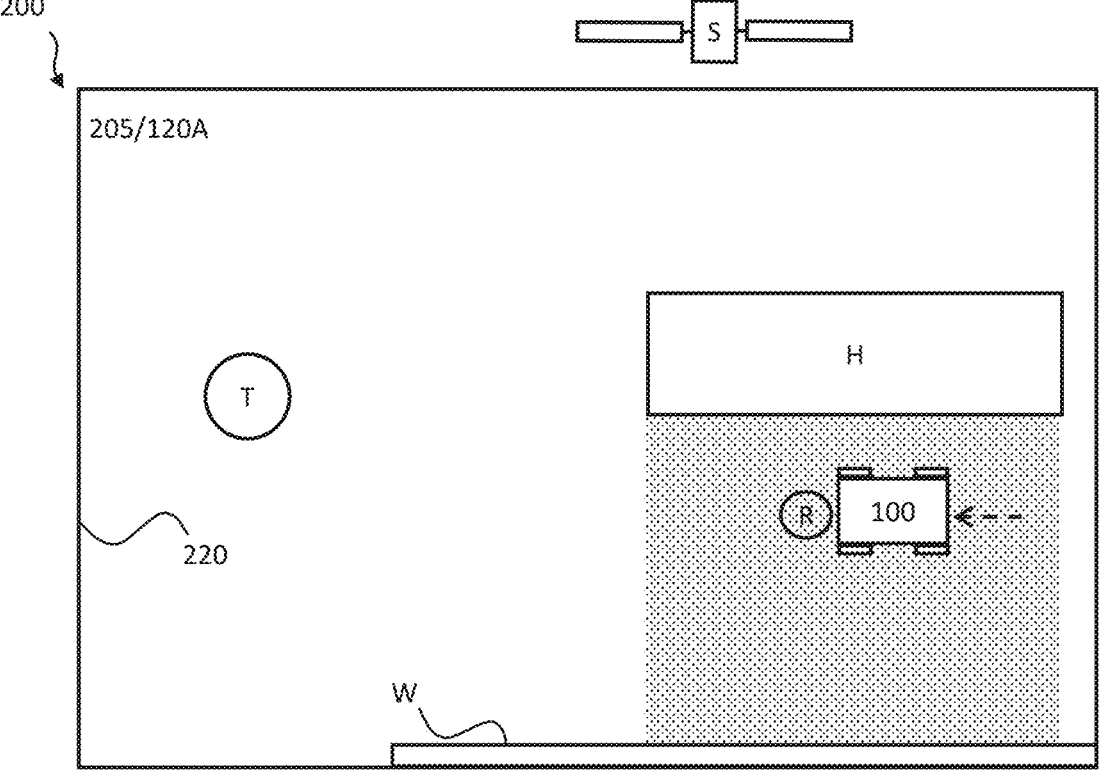
Figure 4D:
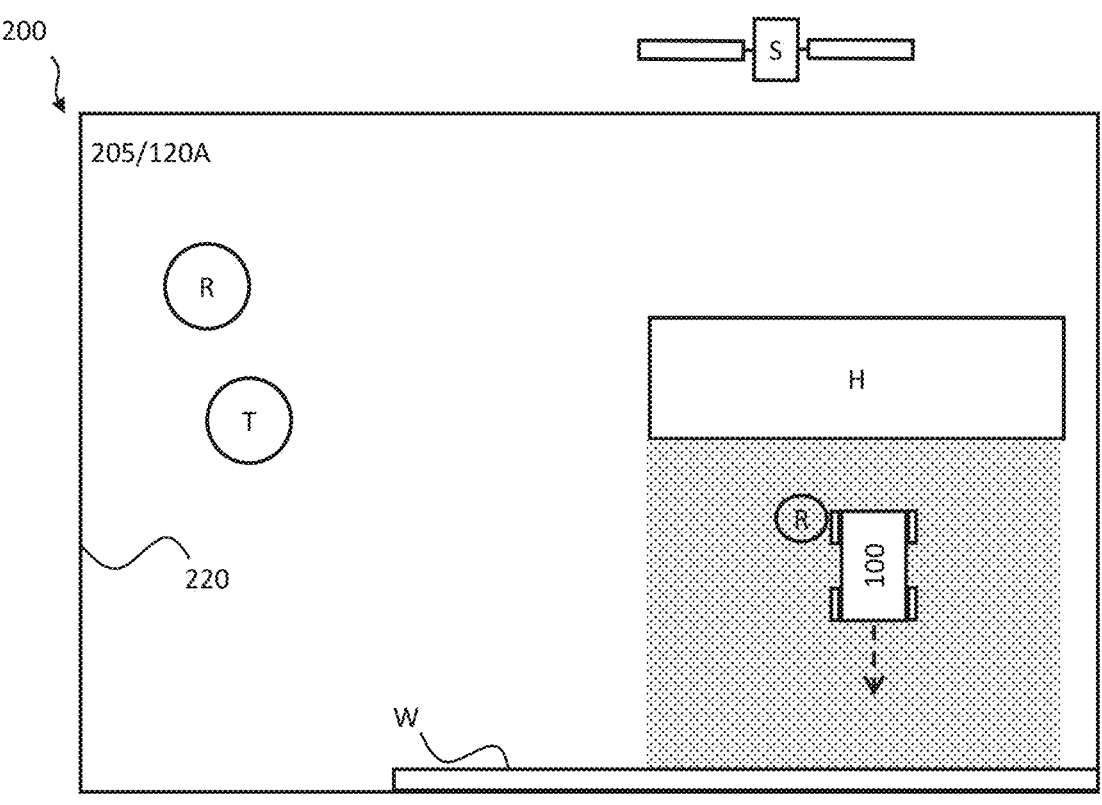

If the reference object is determined to not be at the expected position, the robotic lawnmower 100 halts operating and possibly issues an error message in some embodiments. In some alternative embodiments, where the robotic lawnmower 100 determines that the robotic lawnmower 100 still is allowed to navigate a remainder of the operating distance, the robotic lawnmower 100 is configured to query the map application for a further reference object and attempt to navigate to the further reference object. FIG. 4C shows an example where the robotic lawnmower 100 encounters or reaches an object (in this example a rock R) at an unexpected position. In this example, and in some embodiments the robotic lawnmower 100 is configured to determine that the path to the reference object is unsuccessful and query the map application for a further reference object. FIG. 4D shows the example where the robotic lawnmower 100 is attempting to reach the other known obstacle, the wall W, being a further reference object.

Figure 4E:
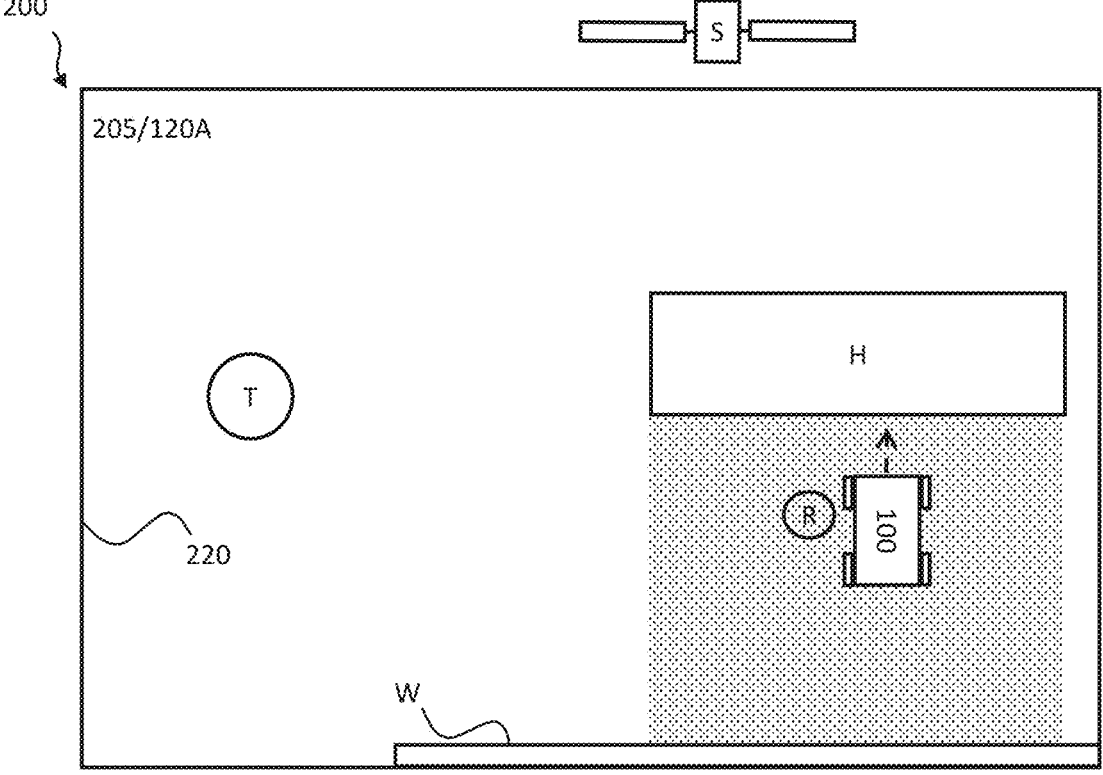

In some alternative embodiments the robotic lawnmower 100 is configured to determine a new path to the reference object and attempt the new path. FIG. 4E shows the example where the robotic lawnmower 100 is attempting to reach the reference object through an alternative path.

Figure 5:
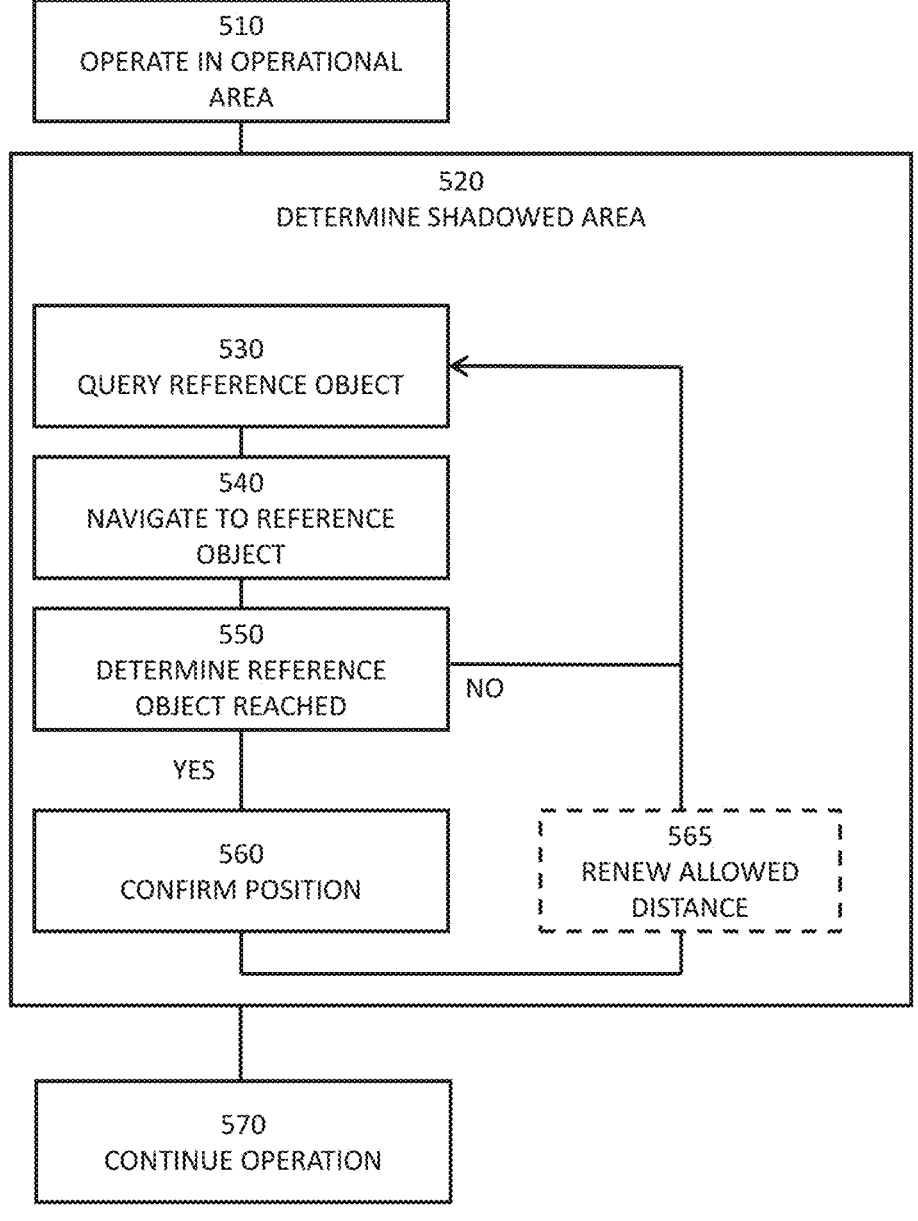
FIG. 5 shows a corresponding flowchart for a method according to some example embodiments of the teachings herein.

FIG. 5 shows a flowchart for a general method according to herein. The method is for use in a robotic lawnmower as in FIG. 1 in a manner as discussed above in relation to FIGS. 4A, 4B, 4C, 4D and 4E. The method comprises the robotic lawnmower 100 operating 510 in the operational area 205 possibly according to an intended pattern. As the robotic lawnmower 100 determines 520 that the robotic lawnmower 100 is in a satellite shadowed area, the robotic lawnmower 100 queries 530 the map application for a reference object as discussed above. The robotic lawnmower then navigates 540 to the reference object for an (allowed) operating distance. The robotic lawnmower 100 then determines 550 that the reference object has been reached and if so, confirms 560 the position of the robotic lawnmower 100. In some embodiments the deduced reckoning sensors are also calibrated based on the confirmed new position as part of the confirmation of the position.

In some embodiments the allowed distance is renewed (as in increased) 565 as the position is confirmed. In some embodiments the allowed distance is increased by being set as discussed above. In some embodiments the allowed distance is increased by being increased by the distance travelled since the last confirmed position (i.e. the distance travelled to reach the reference object).

As the reference object has been reached, the robotic lawnmower 100 queries 540 for a further reference object and continues as per above and as indicated by the arrow in FIG. 5.

In some embodiments, and if the robotic lawnmower determines that the reference object has not been reached at the expected position (arrow referenced NO in FIG. 5), the robotic lawnmower queries for a (further) reference object. In some embodiments this is continued until the allowed distance is consumed.

The navigating and reconfirming of positions is continued while the robotic lawnmower 100 determines that the robotic lawnmower 100 is in the satellite shadowed area, and as the robotic lawnmower 100 again receives reliable satellite reception, the robotic lawnmower 100 continues operation 570.

The invention claimed is:

1. A robotic lawnmower system comprising a robotic lawnmower arranged to operate in an operational area, the robotic lawnmower comprising a satellite navigation sensor, a deduced reckoning sensor, an object sensor, a memory storing a memory application, and a controller, wherein the controller is configured to:

cause the robotic lawnmower to operate in the operational area based on the satellite navigation sensor, determine that the robotic lawnmower is in a satellite shadowed area and in response thereto query the map application for a reference object, cause the robotic lawnmower to navigate to the reference object based on the deduced reckoning sensor, determine that the reference object has been reached based on the object sensor and, if so, confirm a new position of the robotic lawnmower, determine that the robotic lawnmower is not in the satellite shadowed area and in response thereto cause the robotic lawnmower to again operate in the operational area based on the satellite navigation sensor, wherein the controller is further configured to query the map application for the reference obstacle within an allowed distance, and wherein the allowed distance is 1, 5, or 10 meters or any range there inbetween.

2. The robotic lawnmower system according to claim 1, wherein the controller is further configured to query the map application for a further reference object based on the new position and cause the robotic lawnmower to navigate to the further reference object based on the deduced reckoning sensor.

3. The robotic lawnmower system according to claim 1, wherein the controller is further configured to cause the robotic lawnmower to navigate to the further reference object based on the deduced reckoning sensor for an allowed distance.

4. The robotic lawnmower system according to claim 1, wherein the controller is further configured to increase the allowed distance as the new position is confirmed.

5. The robotic lawnmower system according to claim 1, wherein the controller is further configured to cause the robotic lawnmower to navigate in the operational area according to an intended pattern.

6. The robotic lawnmower system according to claim 1, wherein the controller is further configured to determine that the reference object has been reached by determining that the reference object is at an expected position.

7. The robotic lawnmower system according to claim 6, wherein the controller is further configured to determine that the reference object has not been reached by determining that the reference object is not at an expected position and in response thereto query the map application for a further reference object.

8. The robotic lawnmower system according to claim 6, wherein the controller is further configured to determine that the reference object has not been reached by determining that the reference object is not at an expected position and in response thereto cause the robotic lawnmower to navigate to the reference object along an alternative path.

9. The robotic lawnmower system according to claim 1, wherein the controller is further configured to query the map application for the reference object being a known obstacle being closest to the robotic lawnmower.

10. The robotic lawnmower system according to claim 9, wherein the controller is further configured to query the map application for the known obstacle being closest to the robotic lawnmower in a direction of travel for the robotic lawnmower, +/−90 degrees.

11. The robotic lawnmower system according to claim 10, wherein the controller is further configured to query the map application for the known obstacle being closest to the robotic lawnmower in a path of an intended operating pattern.

12. The robotic lawnmower system according to claim 1, wherein the controller is further configured to calibrate the deduced reckoning sensor based on the confirmed new position.

13. A robotic lawnmower system comprising a robotic lawnmower arranged to operate in an operational area, the robotic lawnmower comprising a satellite navigation sensor, a deduced reckoning sensor, an object sensor, a memory storing a memory application, and a controller, wherein the controller is configured to:

cause the robotic lawnmower to operate in the operational area based on the satellite navigation sensor, determine that the robotic lawnmower is in a satellite shadowed area and in response thereto query the map application for a reference object, cause the robotic lawnmower to navigate to the reference object based on the deduced reckoning sensor, determine that the reference object has been reached based on the object sensor and, if so, confirm a new position of the robotic lawnmower, determine that the robotic lawnmower is not in the satellite shadowed area and in response thereto cause the robotic lawnmower to again operate in the operational area based on the satellite navigation sensor, wherein the controller is further configured to query the map application for the reference obstacle within an allowed distance, and wherein the allowed distance is 1 or 2 times the length of the robotic lawnmower.

14. A method for use in a robotic lawnmower system comprising a robotic lawnmower arranged to operate in an operational area, the robotic lawnmower comprising a satellite navigation sensor, a deduced reckoning sensor, an object sensor, and a memory storing a memory application, wherein the method comprises causing the robotic lawnmower to operate in the operational area based on the satellite navigation sensor, determining that the robotic lawnmower is in a satellite shadowed area and in response thereto querying the map application for a reference object, causing the robotic lawnmower to navigate to the reference object based on the deduced reckoning sensor, determining that the reference object has been reached based on the object sensor and, if so, confirming a new position of the robotic lawnmower, determining that the robotic lawnmower is not in the satellite shadowed area and in response thereto causing the robotic lawnmower to again operate in the operational area based on the satellite navigation sensor wherein the controller is further configured to query the map application for the reference obstacle within an allowed distance;

wherein the allowed distance is 1, 5, or 10 meters or any range there inbetween.

\* \* \* \* \*